United States Patent
Marini et al.

(10) Patent No.: US 12,497,954 B2
(45) Date of Patent: Dec. 16, 2025

(54) COMPACT VOLUMETRIC PUMP

(71) Applicant: DANA ITALIA S.R.L., Trentino (IT)

(72) Inventors: Michelangelo Marini, Trento (IT); Matteo Dallapiccola, Trento (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 32 days.

(21) Appl. No.: 18/158,074

(22) Filed: Jan. 23, 2023

(65) Prior Publication Data

US 2024/0247647 A1    Jul. 25, 2024

(51) Int. Cl.
| | |
|---|---|
| F04B 9/04 | (2006.01) |
| F04B 7/00 | (2006.01) |
| F04B 7/04 | (2006.01) |
| F04B 9/06 | (2006.01) |
| F04B 15/02 | (2006.01) |
| F04B 19/22 | (2006.01) |
| F04B 53/14 | (2006.01) |
| F04B 53/16 | (2006.01) |
| F16H 57/04 | (2010.01) |

(52) U.S. Cl.
CPC ............... *F04B 9/042* (2013.01); *F04B 7/04* (2013.01); *F04B 53/14* (2013.01); *F04B 53/162* (2013.01); *F04B 7/008* (2013.01); *F04B 9/045* (2013.01); *F04B 9/06* (2013.01); *F04B 15/02* (2013.01); *F04B 19/22* (2013.01); *F16H 57/0436* (2013.01)

(58) Field of Classification Search
CPC ........ F04B 9/042; F04B 53/14; F04B 53/162; F04B 7/008; F04B 7/04; F04B 9/045; F04B 9/06; F04B 15/02; F04B 19/22; F16H 57/0436
See application file for complete search history.

(56) References Cited

U.S. PATENT DOCUMENTS

| | | | |
|---|---|---|---|
| 5,102,310 A | 4/1992 | Gander et al. | |
| 6,474,963 B1 * | 11/2002 | Wetzel | B60T 8/4031 417/470 |
| 6,514,055 B1 * | 2/2003 | Schuller | F04B 19/022 417/469 |
| 6,514,056 B1 * | 2/2003 | Schuller | F04B 1/0452 417/551 |
| 9,599,082 B2 | 3/2017 | VanDerWege et al. | |

FOREIGN PATENT DOCUMENTS

WO    WO-2010046953 A1 *    4/2010    ................ F04B 7/04

OTHER PUBLICATIONS

WO2010046953 translation (Year: 2024).*

* cited by examiner

*Primary Examiner* — David N Brandt
(74) *Attorney, Agent, or Firm* — McCoy Russell LLP

(57) ABSTRACT

Methods and systems for a mechanically driven pump are provided. The mechanically driven pump may apply a piston simultaneously to operate as a guillotine blocking valve and a component to transfer motive force. A spring may apply a force to the piston to oppose a force that is applied to the piston via a cam lobe. The mechanically driven pump exhibits a differential pressure at a calibrated orifice during two working phases of the pump (expansion and compression), which provides for a non-zero volumetric efficiency of the mechanically driven pump.

18 Claims, 6 Drawing Sheets

COMPACT VOLUMETRIC PUMP

TECHNICAL FIELD

The present disclosure relates to a volumetric pump that provides focused lubrication to mechanical components.

BACKGROUND AND SUMMARY

Mechanical systems may include sliding components and rotating components (e.g., gears, shafts, bearings, etc.) that are lubricated to reduce friction and wear. In some applications, these components may be passively lubricated by some components splashing lubricant on other components that are enclosed in a closed volume (e.g., a gearbox). For example, gears on one shaft of a transmission that are at least partially submerged in lubricant may fling the lubricant within a gear box to lubricate gears on another shaft of the transmission that are not submerged in lubricant. While lubricating components in this way may be effective, it may also be less efficient than may be desired. In particular, a large amount of lubricant may be splashed to locations in the gearbox where lubrication is not needed and more than a desired amount of energy may be consumed to fling the lubricant throughout the gearbox.

One way to reduce losses that may be associated with lubricating mechanical components may be to provide focused lubrication that targets areas of components where wear and friction may be expected to occur. The focused lubrication may be supplied by a pump and output of the pump may be directed to lubricate areas via passages or conduits so that excess lubrication may be avoided. The pump may supply a second pump with lubricant or the pump may supply a reservoir with the lubricant and the lubricant may be fed to lubricated components via gravity.

An electrically driven pump may be applied to supply lubricant to lubricated components from inside of the gearbox or lubricated area, but electrically driven pumps require electrical connections and/or wires to supply electric power to the electrically driven pump. These connections may make the pumps and the areas that are serviced by the pumps less reliable. On the other hand, pumps that are located outside of the lubricated area may supply lubricant to the lubricated areas via conduits or passages, but these external conduits or passages may be subject to external leaks.

The inventors have recognized the aforementioned challenges and developed a pump, comprising: a spring; a piston configured to receive the spring; and a pump body including a cylindrical cavity configured to receive the spring.

By providing a reduced complexity mechanically driven pump within confines of an area that contains lubricated components, it may be possible to provide highly reliable focused lubrication to components without significant leakage risk at low cost. Further, the pump may operate irrespective of a direction of rotation of a driving source so that lubrication may be reliable. Further still, the pump may be self-priming independent of fractions of air and lubricant so that lubricant flow may be maintained if the pump is deployed in a dry sump environment.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A mechanically driven pump having few components as disclosed herein may provide high reliability at low expense. Further, such a pump may reduce a possibility of fluid leaks from a gear box or other lubricated area. The mechanically driven pump also has the advantage of being able to function irrespective of a direction energy is input to the pump. The mechanically driven pump may also operate without a controller and actuators. The mechanically driven pump is a cam driven spring operated pump. The mechanically driven pump applies a piston to simultaneously operate as a valve and a force transfer mechanism.

Further, the mechanically driven pump is self-priming so that it may operate to move a fluid, such as a lubricant, when air is present at the pump.

FIGS. 1-9 are drawn approximately to scale. However, the mechanically driven pump may have other relative component dimensions in alternate embodiments.

Figure 1:
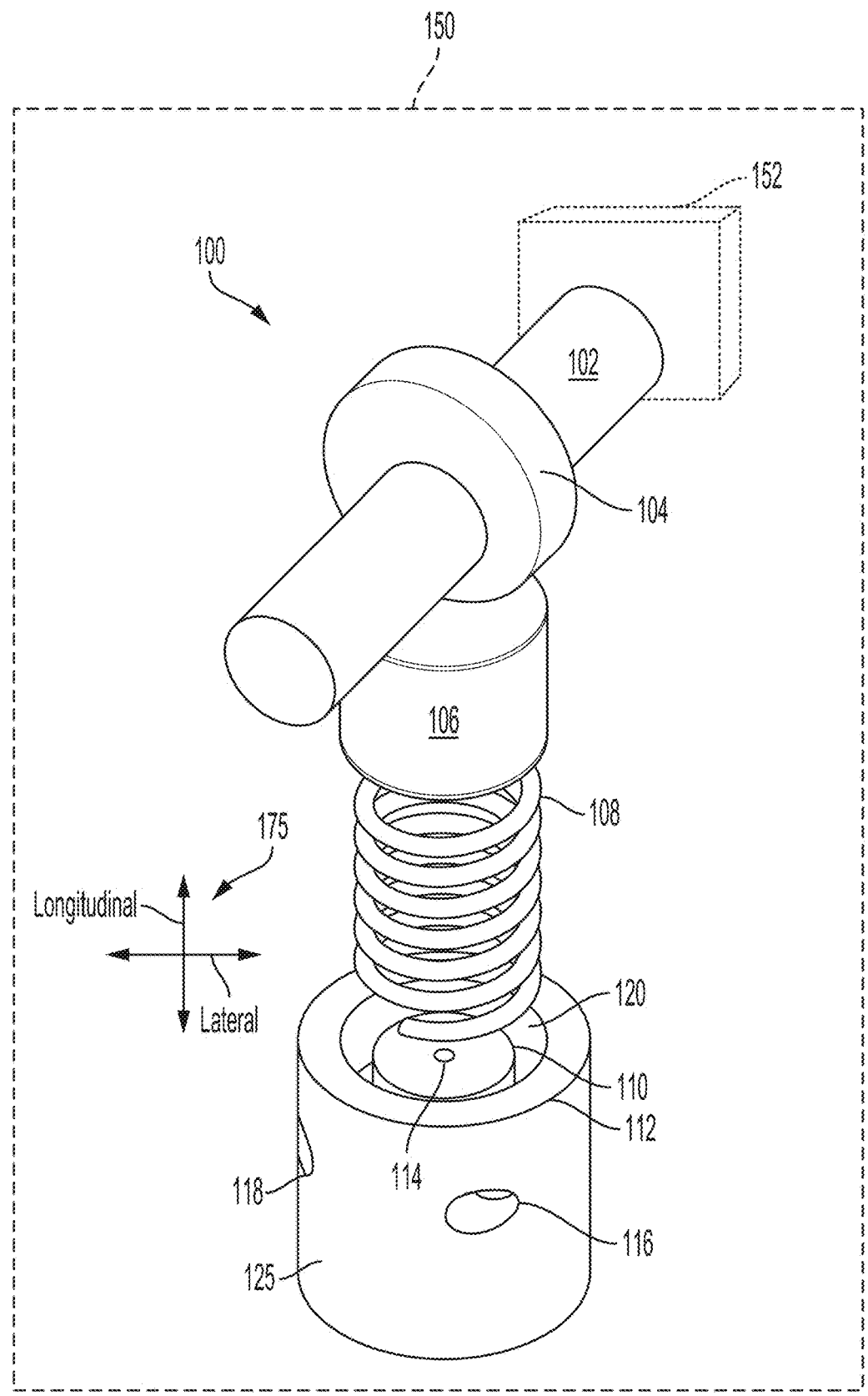
FIG. 1 is an exploded view of a mechanically driven pump.

FIG. 1 shows an exploded view of mechanically driven pump 100. The mechanically driven pump 100 may be housed in an enclosed environment 150. The enclosed environment may be a gearbox, transmission, axle, differential, or other area where lubrication is provided to gears, sliding surfaces, etc. Mechanically driven pump 100 may be supplied with a rotational or reciprocal energy source 152 to drive the mechanically driven pump 100.

In this example, energy may be transferred to mechanically driven pump 100 via cam lobe 104 of camshaft 102. Cam lobe 104 is eccentric such that it may change a position of piston 106 relative to pump body 112 as cam lobe 104 and camshaft 102 rotate. Cam lobe 104 and camshaft 102 may rotate in either a clockwise or counterclockwise direction to operate mechanically driven pump 100. Cam lobe 104 is in direct physical contact with piston 106 and it may transfer mechanical energy to piston 106 as cam lobe 104 rotates.

Figure 3:
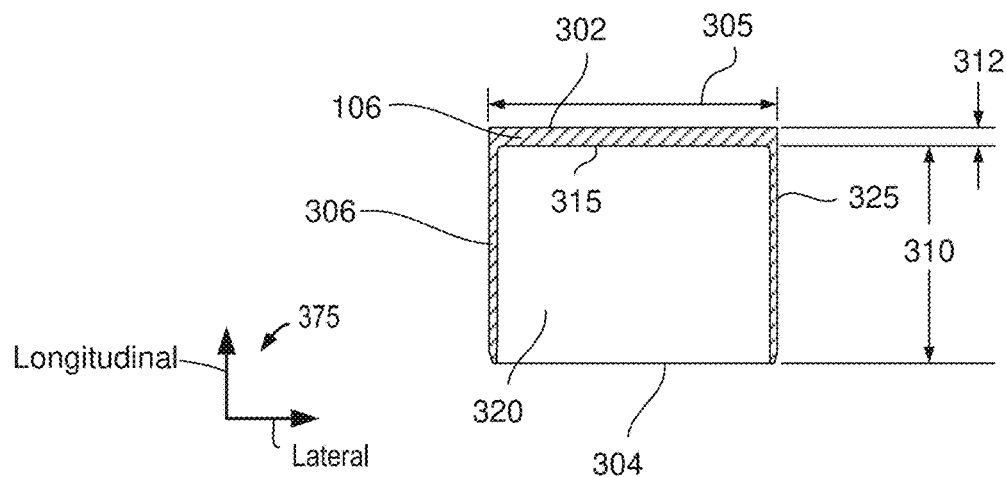
FIG. 3 is a cross-sectional view of a piston for the mechanically driven pump.

Piston 106 is cylindrical in shape and it includes a cavity that is shown in FIG. 3. The cavity is configured to accept spring 108. Spring 108 and piston 106 are configured to slide into cylindrical cavity 120 of pump body 112. Cylindrical protrusion 110 is positioned centrally within cylindrical cavity 120 and spring 108 and piston 106 are configured to slide over cylindrical protrusion 110. Pump body 112 and cylindrical protrusion 110 operate to guide piston 106 so that piston 106 may reciprocate in a longitudinal direction of mechanically driven pump 100.

Pump body 112 includes a first inlet port 118 and a second inlet port 116. The first inlet port 118 and the second inlet port 116 are located along exterior sidewall 125. Pump body 112 also includes an outlet port 114 that is positioned at a top side of cylindrical protrusion 110.

Figure 2:
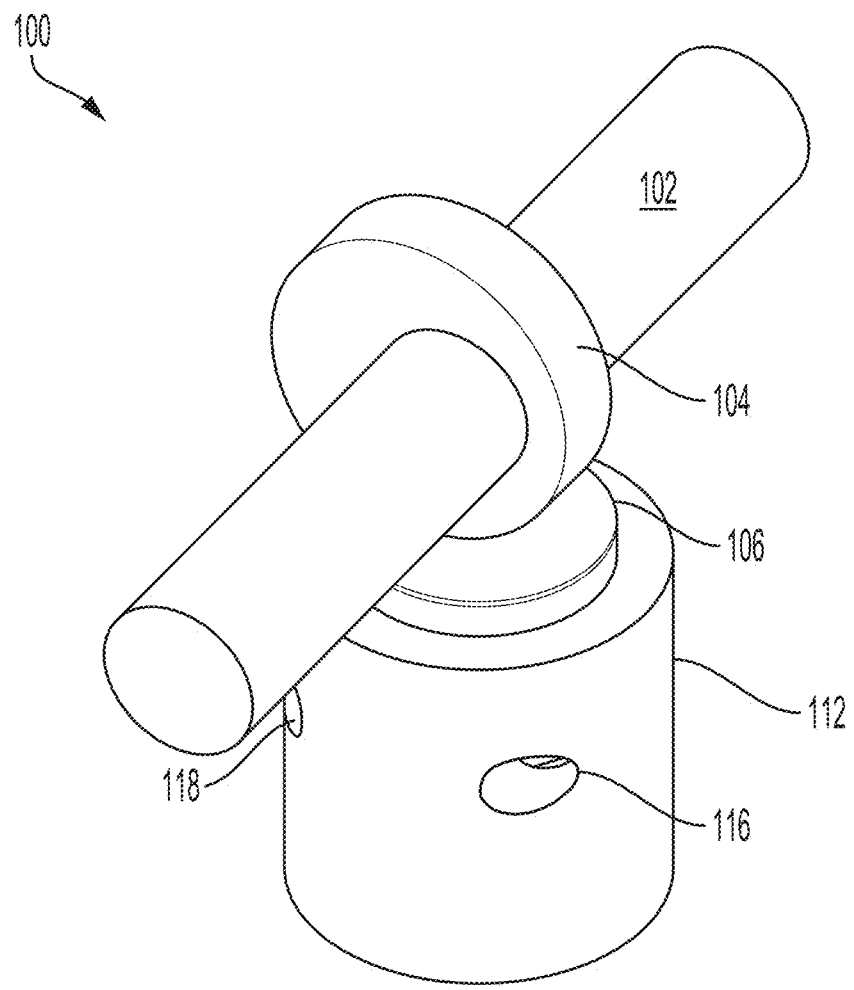
FIG. 2 is an assembled view of the mechanically driven pump.

Referring now to FIG. 2, an assembled perspective view of mechanically driven pump 100 is shown. Mechanically driven pump 100 is shown in a position where cam lobe 104 impinges on piston 106 in section of cam lobe 104 that is off the base circle of cam lobe 104 such that piston is beginning to be pushed further into pump body 112. First inlet port 118 and second inlet port 116 may allow lubricant to flow into pump body 112 when mechanically driven pump 100 is in this position.

Referring now to FIG. 3, a cross-section of piston 106 is shown. Piston 106 includes a top 302 and piston side wall 306. Piston 106 also includes a bottom 304 and a cavity 320 that extends from bottom 304 to interior top wall 315. Top 302 of piston 106 has a thickness that is indicated at 312 and a skirt length indicated at 310. The piston skirt 325 is the portion of piston side wall 306 that is shown below interior top wall 315. The piston skirt 325 helps to keep piston 106 aligned in the cylindrical cavity 120 shown in FIG. 1 so that piston 106 may avoid locking. A length of piston skirt 325 may be at least 81% and no more than 84% of the piston diameter length as indicated by arrow 305. In one example there may be clearance between piston 106 and the pump bore shown in FIG. 4 of at least 0.04 millimeters and less than 0.12 millimeters. Additionally, at any position along the pump stroke, the piston skirt 325 may be coupled with the bore (indicated at 405 of FIG. 4) of the pump body for not less than a predetermined amount of the pump stroke (e.g., 4/3). Piston 106 is shown relative to reference axis 375.

Figure 4:
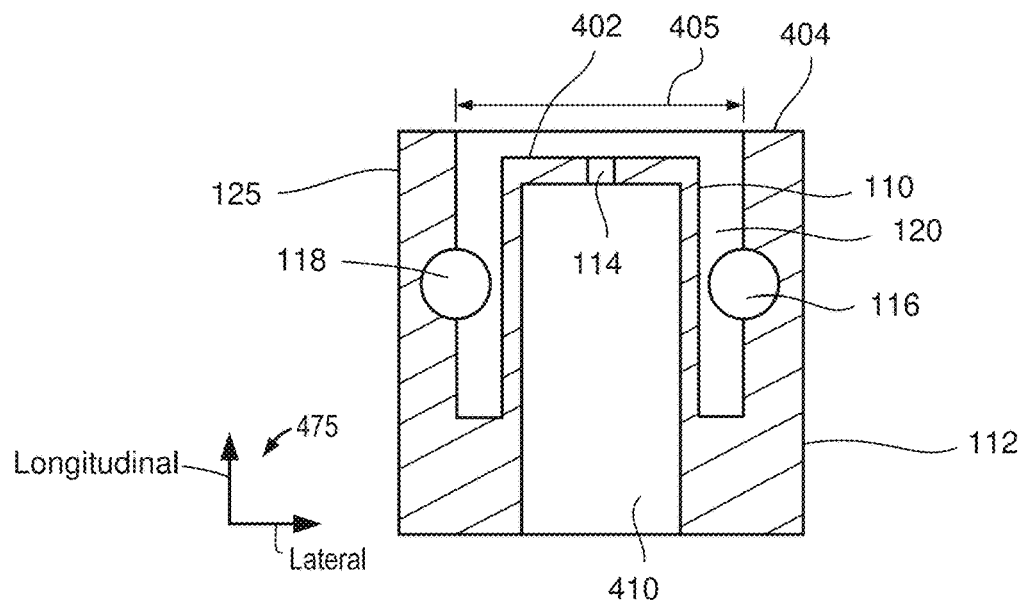
FIG. 4 is a cross-sectional view of a pump body of the mechanically driven pump.
Figure 8:
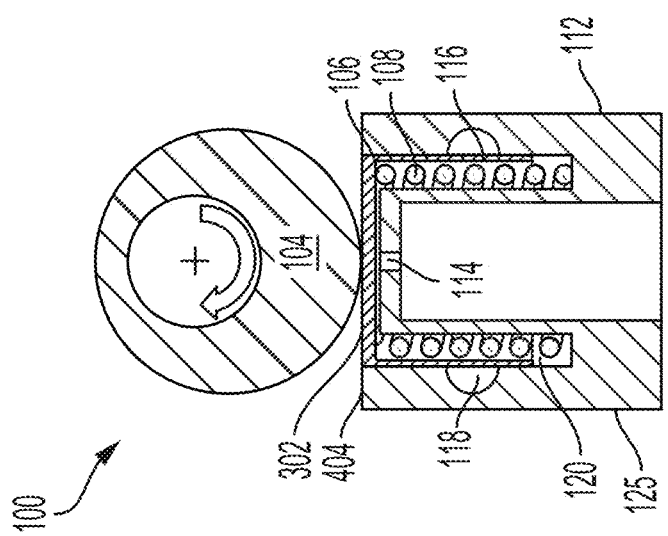

Moving on to FIG. 4, a cross-section of pump body 112 is shown. Pump body 112 is shown with first inlet port 118 and second inlet port 116 piercing exterior sidewall 125 and allowing fluidic access to cylindrical cavity 120 from outside of mechanically driven pump 100 (not shown). Outlet port 114 allows fluidic between cylindrical cavity 120 and cylindrical cavity 410. Outlet port 114 is a through hole in top 402 of cylindrical protrusion 110. Pump body 112 has a top side 404 that is above or offset from top 402 of cylindrical protrusion 110 so that top 302 of piston 106 (not shown) may sit flush with top side 404 of pump body 112 when piston 106 is seated in pump body 112 as shown in FIG. 8. Cylindrical cavity 410 has a bore as indicated at arrow 405. In one example the bore may be >=30.0 millimeters and <=40 millimeters. Pump body 112 is shown relative to reference axis 475.

Figure 5:
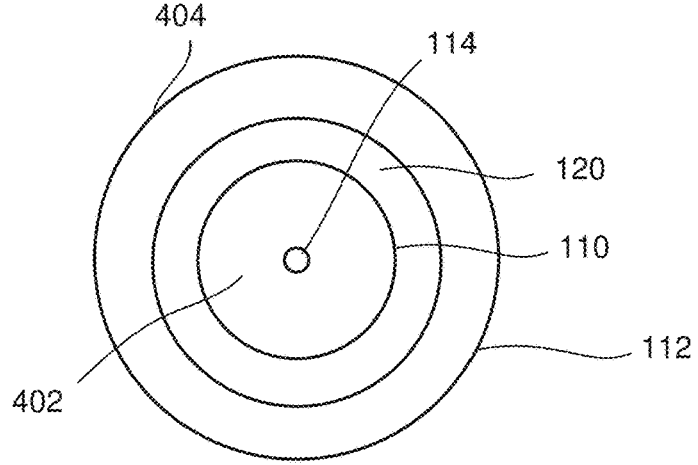
FIG. 5 is a plan view of the pump body of the mechanically driven pump.

Turning to FIG. 5, a plan view of pump body 112 is shown. Top side 404 of pump body 112 is circular in shape. Likewise, top 402 of cylindrical protrusion 110 is circular in shape. The pump body 112 allows piston 106 to reciprocate in a longitudinal direction of mechanically driven pump 100.

Referring now to FIGS. 6-9, an operating sequence where mechanically driven pump 100 is illustrated at different positions is shown. In the sequence of FIGS. 6-9, piston 106 moves radially with respect to camshaft axis 601 and cam lobe 104 rotates clockwise as indicated by arrow 602.

Figure 6:
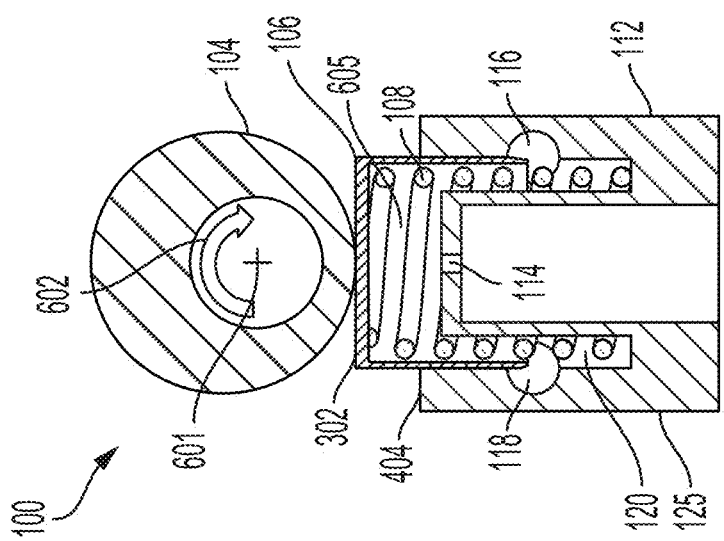
Figure 6:
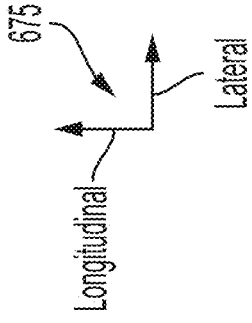

FIG. 6 shows piston 106 in its fully extended position relative to pump body 112. One end of spring 108 is in direct contact with pump body 112 and the other end of spring 108 is in direct contact with interior top wall 315 of piston 106. Spring 108 presses directly against piston 106 in order to force piston 106 against cam lobe 104. Spring 108 pushes piston away from pump body 112 to generate suction to draw lubricant into the area 605 under the piston 106. The spring stiffness may be chosen based on acceleration of piston 106, mass of piston 106, and force exerted on the piston that is due to suction action. Piston acceleration depends on camshaft velocity and the camshaft profile. In one example, the maximum camshaft speed may be 1500 revolutions/minute, a cam lobe lift or stroke of 10 millimeters, a piston mass of 32 grams, a minimum spring stiffness of 4000 Newtons/meter may be recommended.

The first inlet port 118 and the second inlet port 116 may be pass through holes that are drilled having their axis tangential to the piston bore that is formed via the cylindrical cavity 120. The inlets may have a diameter in a range of between 8 and 10 millimeters. The first inlet port 118 and the second inlet port 116 may be positioned along exterior sidewall 125 such that when the piston is at TDC, the inlet port is partially closed. When the piston is roughly halfway through the compression stroke toward BDC, the inlet ports are closed and they remain closed until the piston reaches BDC. The inlet ports open again halfway through the expansion stroke toward TDC. Thus, piston 106 may act as a guillotine valve to allow or prevent flow through mechanically driven pump 100. No other valves are provided at the inlets to the mechanically driven pump 100. Outlet port 114 is machined into pump body 112. In particular, outlet port 114 is machined into cylindrical protrusion 110 (e.g., a spring support rod) as a calibrated orifice. In one example, the calibrated orifice may have a diameter that is greater than 2.5 millimeters and less than 5 millimeters.

Figure 7:
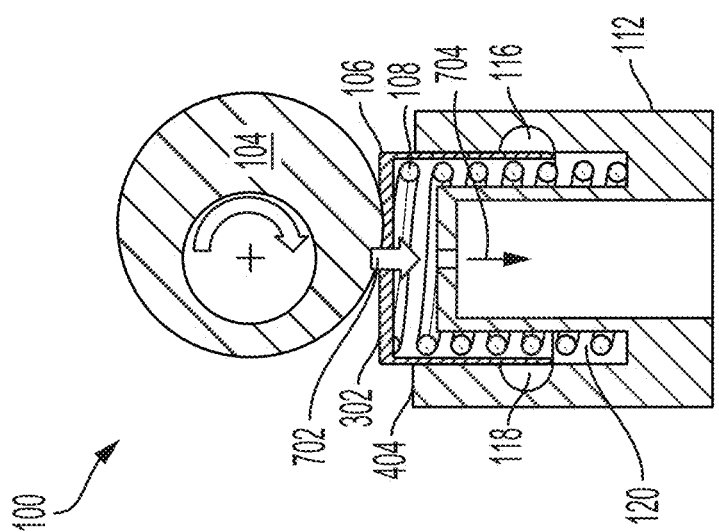
FIGS. 6-9 show an operating sequence for the mechanically driven pump.
Figure 7:
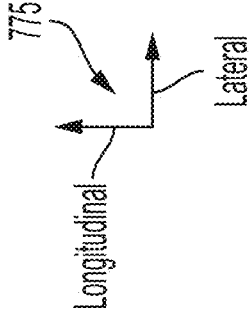

FIG. 6 shows piston 106 at a TDC position where lubricant may flow into mechanically driven pump 100. When piston 106 moves away from TDC and toward BDC as indicated by arrow 602, the first half of the piston stroke generates little if any flow at outlet port 114 since the first inlet port 118 and the second inlet port 116 are open. Once cam lobe 104 compresses spring 108 and causes piston 106 to cover first inlet port 118 and second inlet port 116 as shown in FIG. 7, flow through outlet port 114 may increase as indicated by arrow 704. The force that cam lobe 104 applies to piston 106 is indicated by arrow 702.

Figure 9:
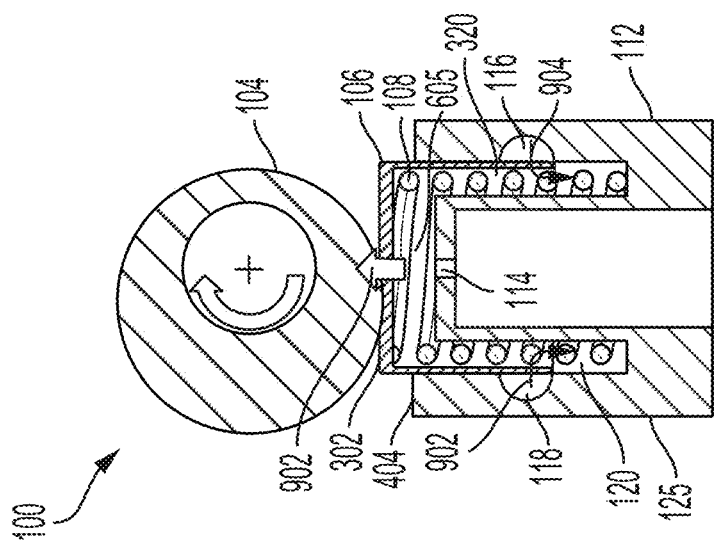

FIG. 8 shows piston 106 at BDC position where flow through outlet port 114 is reduced to near zero. As piston 106 passes BDC some fluid flows back into the area 605 that is under piston 106 and in cavity 320 as shown in FIG. 9. Fluid returns into the cavity 320 as cam lobe 104 rotates until first inlet port 118 and second inlet port 116 begin to open. Once the first inlet port 118 and the second inlet port 116 begin to open, fluid begins to be drawn into mechanically driven pump via first inlet port 118 and second inlet port 116 while flow through outlet port begins to go toward zero. Moving piston 106 away from pump body 112 as indicated by arrow 902 in FIG. 9 causes a lower pressure to develop in cavity 320 which generates flow through first inlet port 118 and second inlet port 116.

The differential pressure that is generated at the outlet port 114 when the piston is approaching BDC (e.g., the compression stroke) is greater in magnitude and opposite in sign than the differential pressure that is generated when the piston is approaching TDC (e.g., during the expansion stroke). This provides for a pump efficiency that is greater than zero so that a net amount of fluid may flow through outlet port 114.

Thus, mechanically driven pump 100 is a two stroke pump that generates flow through outlet port 114 whether cam lobe rotates clockwise or counter-clockwise. Mechanically driven pump 100 has few parts and it may operate absent a controller and an outlet valve. Mechanically driven pump 100 has a high ratio of displacement over clearance volume (e.g., greater than 5 and lower than 15) so it is self-priming. The clearance volume is the volume that can be filled by fluid (e.g., gas or liquid or a mix of the two phases) when the pump is at BDC. The displacement volume is the volume when the piston skirt is closing the inlet ports minus the clearance volume.

Thus, the pump of FIGS. 1-9 provides for a pump, comprising: a spring; a piston configured to receive the spring; and a pump body including a cylindrical cavity configured to receive the spring. In a first example, the pump includes wherein the cylindrical cavity is also configured to receive the piston. In a second example that may include the first example, the pump further comprises one or more inlet ports in the pump body. In a third example that may include one or both of the first and second examples, the pump includes wherein the one or more inlet ports are located in a side wall of the pump body. In a fourth example that may include one or more of the first through third examples, the pump includes where the one or more inlet ports extend through the side wall and into the cylindrical cavity. In a fifth example that may include one or more of the first through fourth examples, the pump includes where the pump body includes a cylindrical protrusion that forms a boundary of the cylindrical cavity. In a sixth example that may include one or more of the first through fifth examples, the pump further comprises an outlet port positioned at one end of the cylindrical protrusion. In a seventh example that may include one or more of the first through sixth examples, the pump further comprises a second cylindrical cavity that extends into the cylindrical protrusion. In an eighth example that may include one or more of the first through seventh examples, the pump includes wherein the outlet port extends through the cylindrical protrusion to allow fluidic communication through the cylindrical protrusion.

The pump of FIGS. 1-9 also provides for a self-priming pump, comprising: a cam lobe; a spring; a piston configured to receive the spring and interact with the cam lobe; and a pump body including a cylindrical cavity configured to receive the spring. In a first example, the self-priming pump is self-priming due to a ratio of a pump displacement volume to a pump clearance volume, and pump further comprises a drive source to rotate the cam lobe. In a second example that may include the first example, the pump further comprises a cylindrical protrusion within the pump body. In a third example that may include one or both of the first and second examples, the pump further comprises a gap between the cylindrical protrusion and an end of the pump body. In a fourth example that may include one or more of the first through third examples, the pump includes wherein the gap is substantially filled via the piston and the spring when the cam lobe fully compresses the spring.

Figure 10:
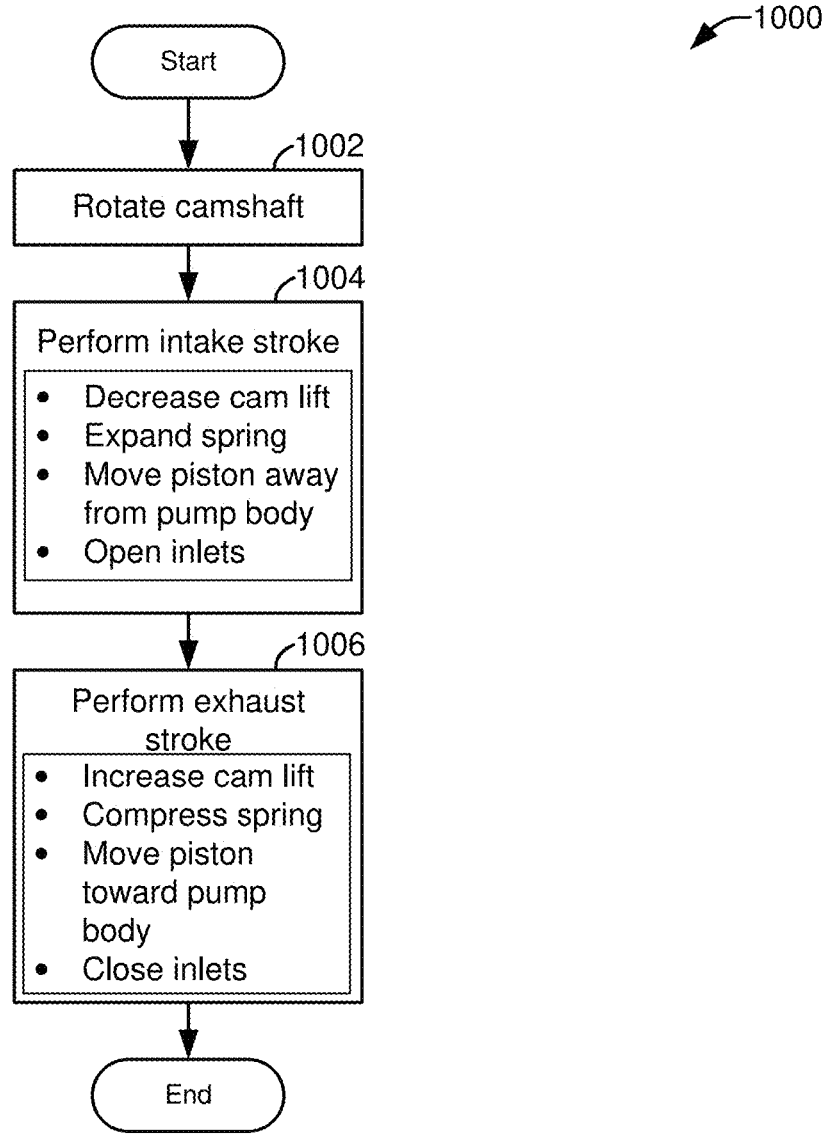
FIG. 10 is a method for operating the mechanically driven pump.

Referring now to FIG. 10, a method for operating a mechanically driven pump is shown. The method of FIG. 10 maybe performed via a mechanically driven pump as shown in FIGS. 1-9.

At 1002, method 1000 rotates a camshaft and a cam lobe to provide motive force to a pump of the type that is shown in FIGS. 1-9. The camshaft may be rotated via a take-off from a rotating shaft in a transmission, gearbox, or other device. Method 1000 proceeds to 1004.

At 1004, method 1000 performs an expansion stroke for the mechanically driven pump. During the expansion stroke, the lift of the cam lobe decreases and a spring applies force to move a piston away from a body of the mechanically driven pump. Moving the piston away from the body of the mechanically driven pump may expand an area between the piston and the body of the mechanically driven pump, thereby reducing pressure within the area that is between the piston and the body of the mechanically driven pump. Moving the piston away from the body of the mechanically driven pump also causes the inlets of the mechanically driven pump to open. In particular, a side wall of the piston uncovers the inlets to allow fluid to flow from the inlets to an area that is between the piston and the body of the mechanically driven pump. The combination of uncovered inlet ports and low pressure under the piston drives flow into the mechanically driven pump. Method 1000 proceeds to 1006.

At 1006, method 1000 performs an compression stroke for the mechanically driven pump. During the compression stroke, the lift of the cam lobe increases so that the cam lobe moves the piston toward BDC and as a consequence the spring is compressed. Thus, the piston moves toward the body of the mechanically driven pump. Moving the piston toward the body of the mechanically driven pump may reduce an area between the piston and the body of the mechanically driven pump, thereby increasing pressure within the area that is between the piston and the body of the mechanically driven pump. Moving the piston toward the body of the mechanically driven pump also causes the inlets of the mechanically driven pump to close. In particular, a side wall of the piston covers the inlets to prevent fluid out of the inlets. The combination of covered inlet ports and higher pressure under the piston drives flow out of the mechanically driven pump. Method 1000 proceeds to exit.

Thus, method 1000 provides for a method for a pump, comprising: rotating a cam lobe to move a piston and selectively extend and compress a spring according to a position of the cam lobe relative to the piston; and pumping a liquid while blocking a flow of the liquid via the piston. In a first example, the method includes wherein blocking the flow of the liquid includes covering one or more inlet ports via the piston. In a second example that may include the first example, the method includes wherein the one or more inlet ports are in a body of the pump. In a third example that may include one or both of the first and second methods, the method further comprises allowing flow of the liquid into the pump via the spring pushing the piston at least partially out of a cylindrical cavity of the pump. In a fourth example that may include one or more of the first through third examples, the method includes wherein pumping the liquid includes pumping the liquid through an outlet port. In a fifth example that may include one or more of the first through fourth examples, the method includes wherein the outlet port is in a cylindrical protrusion of a pump body.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example While various embodiments have been described above, it may be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. A pump, comprising:
a spring;
a piston configured to receive the spring;
a pump body including a cylindrical cavity configured to receive the spring;
a cylindrical protrusion positioned within the cylindrical cavity, the cylindrical protrusion having outer sides that are straight and vertical along a longitudinal cross-section of the cylindrical protrusion and a top side with a flat surface, the outer straight vertical sides and the top side enclosing a second cylindrical cavity, the top side thicker than the outer straight vertical sides, the top side offset from a top of the cylindrical cavity so that the cylindrical protrusion is positioned entirely inside the spring except for a first gap at a first portion of the spring which is level with a top end of the spring and a second gap at a second portion of the spring which is level with a bottom end of the spring when the piston is seated in the pump body; and
an outlet port positioned at the top side of the cylindrical protrusion; wherein the outer straight vertical sides of the cylindrical protrusion are parallel to inner straight vertical sides of a bore of the pump along a longitudinal cross-section of the bore.

2. The pump of claim 1, wherein the top side of the cylindrical protrusion is proximal a cam lobe.

3. The pump of claim 1, further comprising one or more inlet ports in the pump body.

4. The pump of claim 3, wherein the one or more inlet ports are located in a side wall of the pump body.

5. The pump of claim 4, wherein the one or more inlet ports extend through the side wall and into the cylindrical cavity.

6. The pump of claim 1, wherein the cylindrical protrusion forms a boundary of the cylindrical cavity.

7. The pump of claim 1, wherein the outlet port extends through the cylindrical protrusion to allow fluidic communication between the cylindrical cavity and the second cylindrical cavity.

8. A method for a pump, comprising:
rotating a cam lobe to move a piston and selectively extend and compress a spring according to a position of the cam lobe relative to the piston, wherein the spring and the piston are configured to slide over a cylindrical protrusion during operation of the pump, the cylindrical protrusion positioned within a cylindrical cavity of a pump body and having outer sides that are straight and vertical along a longitudinal dimension of the cylindrical protrusion and a top side with a flat surface, the outer straight vertical sides and the top side enclosing a second cylindrical cavity, the top side thicker than the outer straight vertical sides, the top side offset from a top of the cylindrical cavity so that the cylindrical protrusion is positioned entirely inside the spring except for a first gap at a first portion of the spring which is level with a top end of the spring and a second gap at a second portion of the spring which is level with a bottom end of the spring when the piston is seated in the pump body, and wherein an outlet port is positioned at the top side of the cylindrical protrusion; and
pumping a liquid through the outlet port positioned at the top side of the cylindrical protrusion while blocking a flow of the liquid via the piston.

9. The method of claim 8, wherein blocking the flow of the liquid includes covering one or more inlet ports via the piston.

10. The method of claim 9, wherein the one or more inlet ports are in the pump body.

11. The method of claim 8, further comprising allowing the flow of the liquid into the pump via the spring pushing the piston at least partially out of the cylindrical cavity of the pump.

12. The method of claim 8, wherein the top side of the cylindrical protrusion is proximal the cam lobe.

13. The method of claim 12, wherein the outlet port extends through the cylindrical protrusion of the pump body.

14. A self-priming pump, comprising:
a cam lobe;

a spring;

a piston configured to receive the spring and interact with the cam lobe;

a pump body including a cylindrical cavity configured to receive the spring;

a cylindrical protrusion positioned within the cylindrical cavity and having outer sides that are straight and vertical along a longitudinal dimension of the cylindrical protrusion and a top side with a flat surface, the outer straight vertical sides and the top side enclosing a second cylindrical cavity, the top side thicker than the outer straight vertical sides, the top side offset from a top of the cylindrical cavity so that the cylindrical protrusion is positioned entirely inside the spring except for a first gap at a first portion of the spring which is level with a top end of the spring and a second gap at a second portion of the spring which is level with a bottom end of the spring when the piston is seated in the pump body; and an outlet port positioned at the top side of the cylindrical protrusion.

15. The self-priming pump of claim 14, wherein the self-priming pump is self-priming due to a ratio of a pump displacement volume to a pump clearance volume, and further comprising a drive source to rotate the cam lobe.

16. The self-priming pump of claim 14, wherein the top side is a side of the cylindrical protrusion proximal the cam lobe.

17. The self-priming pump of claim 16, further comprising a third gap between the cylindrical protrusion and an end of the pump body.

18. The self-priming pump of claim 17, wherein the third gap is substantially filled via the piston and the spring when the cam lobe fully compresses the spring.

* * * * *